Figure 1:
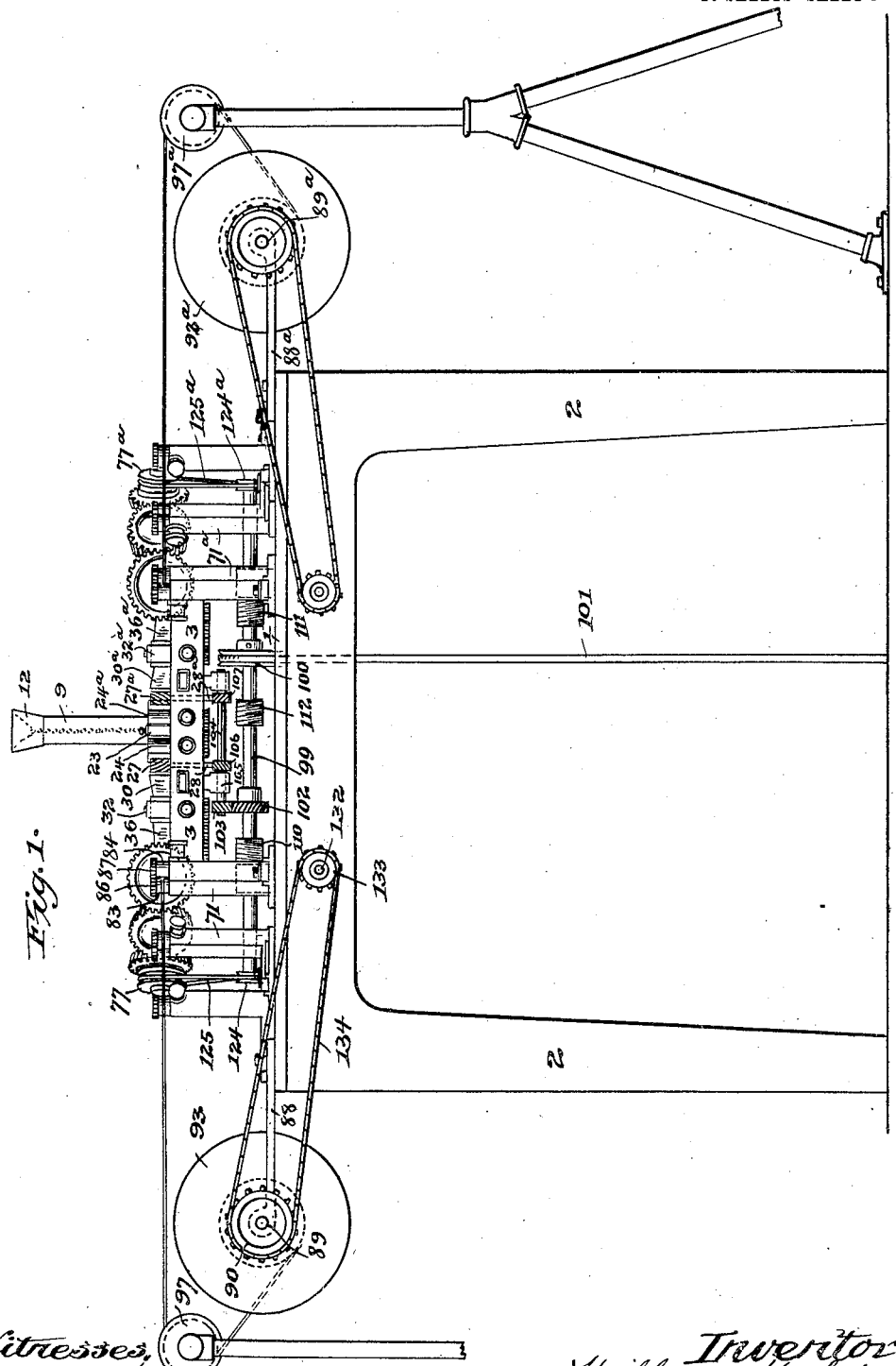

No. 836,621. PATENTED NOV. 20, 1906.
W. WEBSTER.
MACHINE FOR PREPARING QUILL SUBSTANCE.
APPLICATION FILED DEC. 15, 1905.

10 SHEETS—SHEET 1.

No. 836,621. PATENTED NOV. 20, 1906.
W. WEBSTER.
MACHINE FOR PREPARING QUILL SUBSTANCE.
APPLICATION FILED DEC. 15, 1905.

10 SHEETS—SHEET 2.

No. 836,621. PATENTED NOV. 20, 1906.
W. WEBSTER.
MACHINE FOR PREPARING QUILL SUBSTANCE.
APPLICATION FILED DEC. 15, 1905.

10 SHEETS—SHEET 3.

No. 836,621. PATENTED NOV. 20, 1906.
W. WEBSTER.
MACHINE FOR PREPARING QUILL SUBSTANCE.
APPLICATION FILED DEC. 15, 1905.

10 SHEETS—SHEET 4.

No. 836,621. PATENTED NOV. 20, 1906.
W. WEBSTER.
MACHINE FOR PREPARING QUILL SUBSTANCE.
APPLICATION FILED DEC. 15, 1905.

10 SHEETS—SHEET 7.

No. 836,621. PATENTED NOV. 20, 1906.
W. WEBSTER.
MACHINE FOR PREPARING QUILL SUBSTANCE.
APPLICATION FILED DEC. 15, 1905.

10 SHEETS—SHEET 8.

Fig. 8.

Witnesses,
Inventor,
William Webster,
By Offield, Towle & Linthicum,
Attys.

No. 836,621. PATENTED NOV. 20, 1906.
W. WEBSTER.
MACHINE FOR PREPARING QUILL SUBSTANCE.
APPLICATION FILED DEC. 15, 1905.
10 SHEETS—SHEET 9.
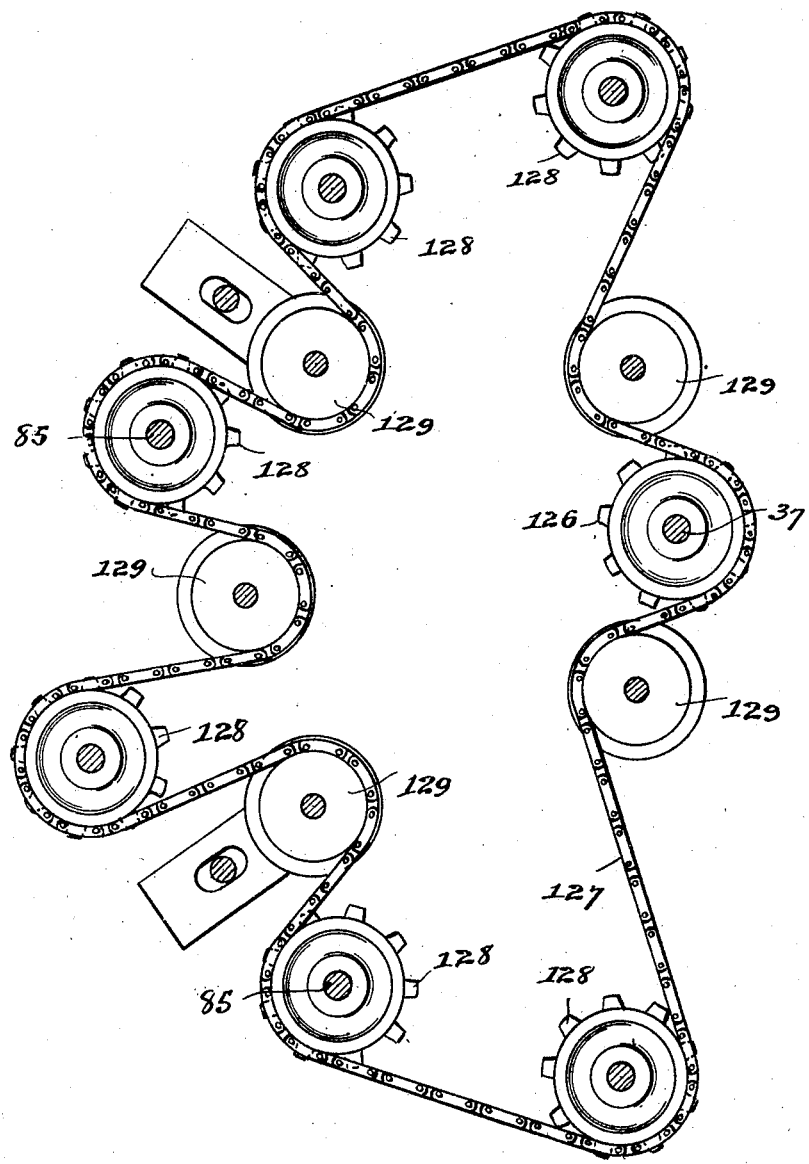

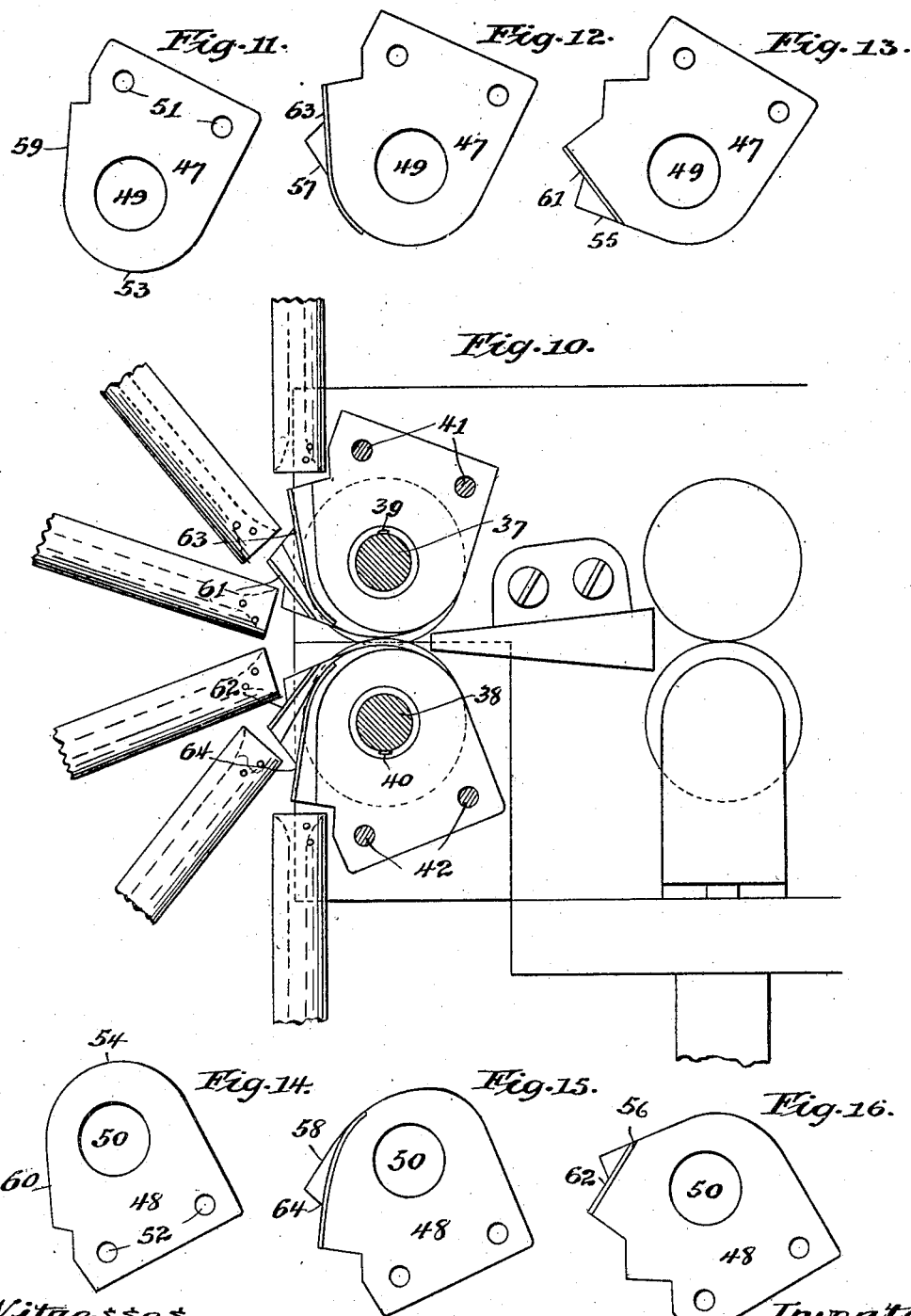

UNITED STATES PATENT OFFICE.

WILLIAM WEBSTER, OF LONDON, ONTARIO, CANADA, ASSIGNOR TO
EDWARD K. WARREN, OF THREE OAKS, MICHIGAN.

MACHINE FOR PREPARING QUILL SUBSTANCES.

No. 836,621.          Specification of Letters Patent.          Patented Nov. 20, 1906.

Application filed December 15, 1905. Serial No. 291,856.

*To all whom it may concern:*

Be it known that I, WILLIAM WEBSTER, a subject of the King of Great Britain, residing at London, in the Province of Ontario, Canada, have invented certain new and useful Improvements in Machines for Preparing Quill Substances, of which the following is a specification.

This invention relates to machines for treating quills in the manufacture of what is commercially known as "featherbone," a substance designed to fill the office of flexible resilient stays in connection with various classes of dress goods.

In the preparation and manufacture of quills into featherbone the quill is first split and thoroughly stripped and cleaned of its contained pith. Thereafter the longitudinal sections of the quill thus cleaned are "fibered"—that is, further split longitudinally into a number of thin narrow slivers or fibers disposed side by side with the end portions of successive bunches of fibers more or less overlapped and intermixed, so as to create a continuous line of substantially uniform caliber, to which is applied a winding or covering of thread to mechanically bind the fibers together. From the wound cords of fiber thus prepared the finished product is created by a special treatment involving immersion in a specially-prepared glue or cement and compressing and solidifying by means of rollers.

The object of the present invention is to provide a new and improved organized machine for transforming quills from their natural state into the wrapped or wound cords of fibered stock through the successive operations of splitting, depithing or cleaning, fibering, and wrapping or winding.

The feather-quills of turkeys and other birds are composed of a relatively hard and tough substance forming the back or convex side of the quill and a softer and more pliant form of the same substance forming the face or concave side of the quill. When the quill is split longitudinally in a plane dividing the back and face of the quill, the two split halves or sections possess these different characteristics in respect to the quality of the substance, and of course where the backs are used exclusively in the make-up of one cord and the faces of the quills are used exclusively in the make-up of another cord these same differences in the quality of the texture will appear in the finished product. Both kinds are useful and valuable, according to the particular purpose or purposes served by the finished product, and another object of the present invention, therefore, is to provide a machine in which by separating the hard and soft sections of the quill cords possessing the described differences of quality and characteristics may be produced.

Still another object of the invention is to provide an improved and simplified mechanism whereby the subdividing of the fibered stock and the delivery of the subdivisions to the receiving-tubes of the winders is effected.

In carrying out the purposes of the present invention I employ in connection with a suitable platform or table a single quill feeding or introducing mechanism and splitting device preferably located about centrally of one side of said table or platform, and on either side of said feeding and splitting devices and extending toward the opposite ends of the table or platform I dispose separate depithing, guiding, fibering, winding or wrapping, and reeling mechanisms which are substantial duplicates of each other, one set of mechanisms taking care of one side of the split quills and the other set similarly operating upon the other side of the split quills.

My invention in its various aspects and general organization of parts will be readily understood when specifically considered in connection with the accompanying drawings, forming a part of this specification, in which I have illustrated a practical mechanical embodiment of the invention, and in which—

Figure 2:
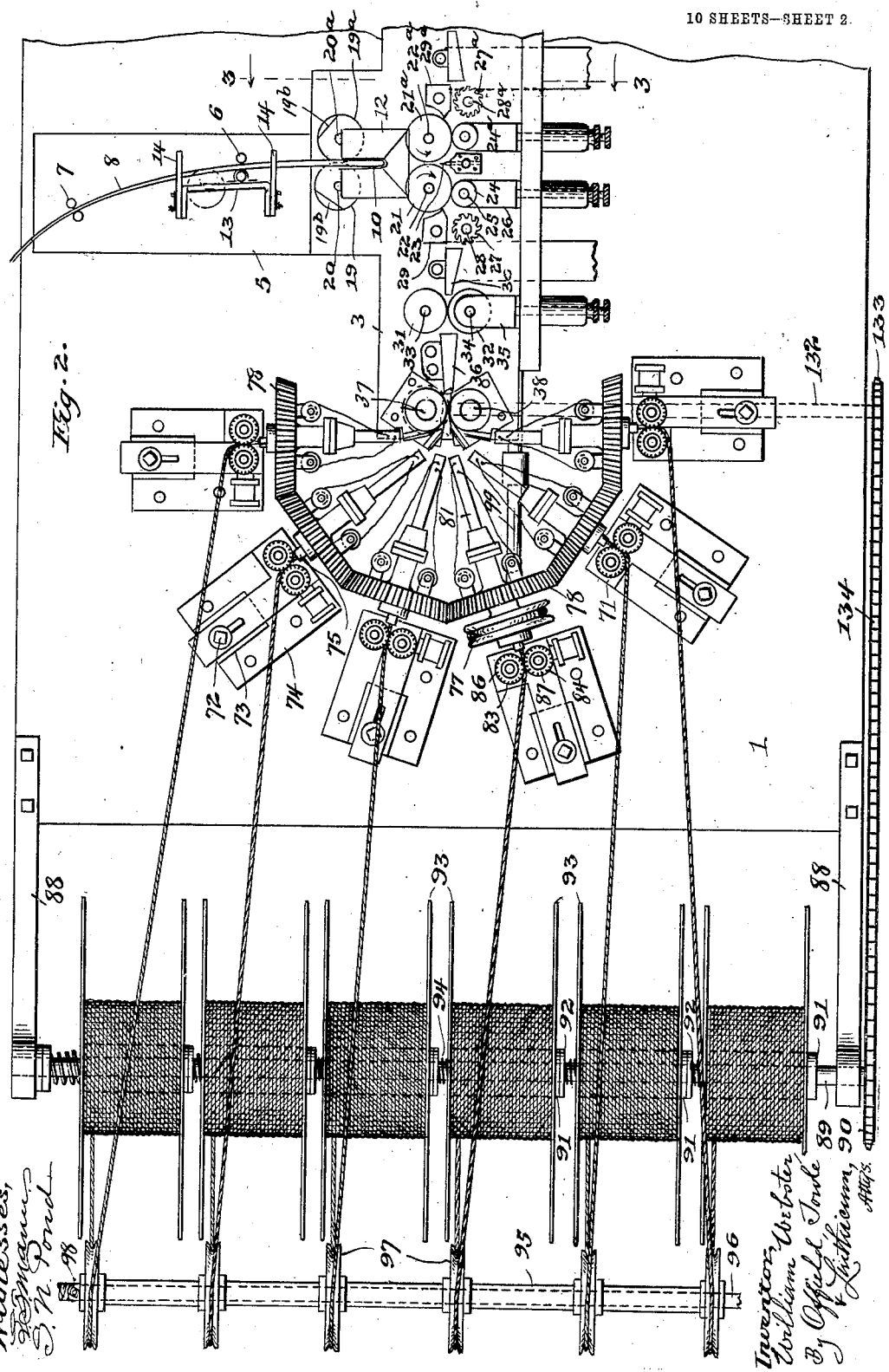
Figure 3:
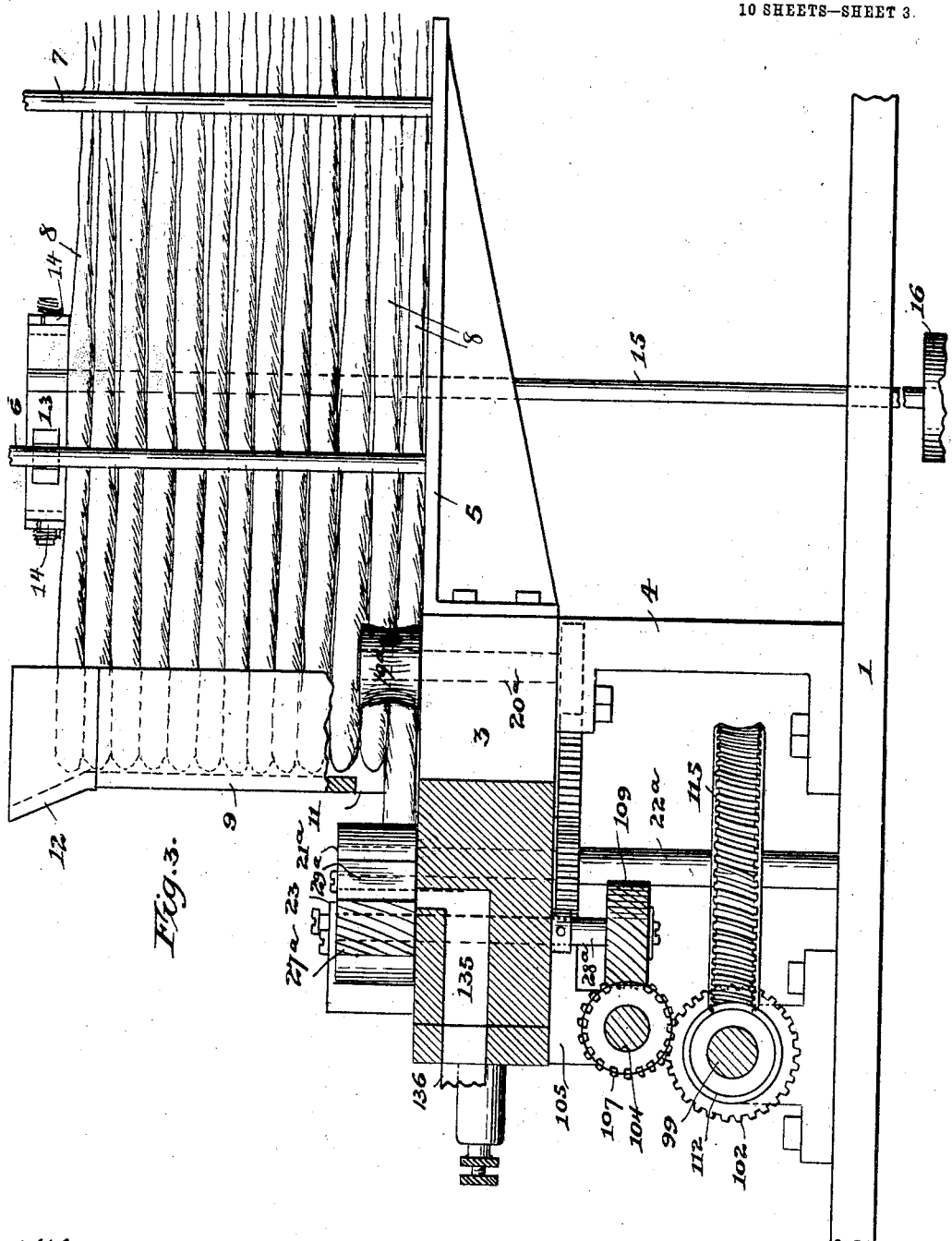
Figure 4:
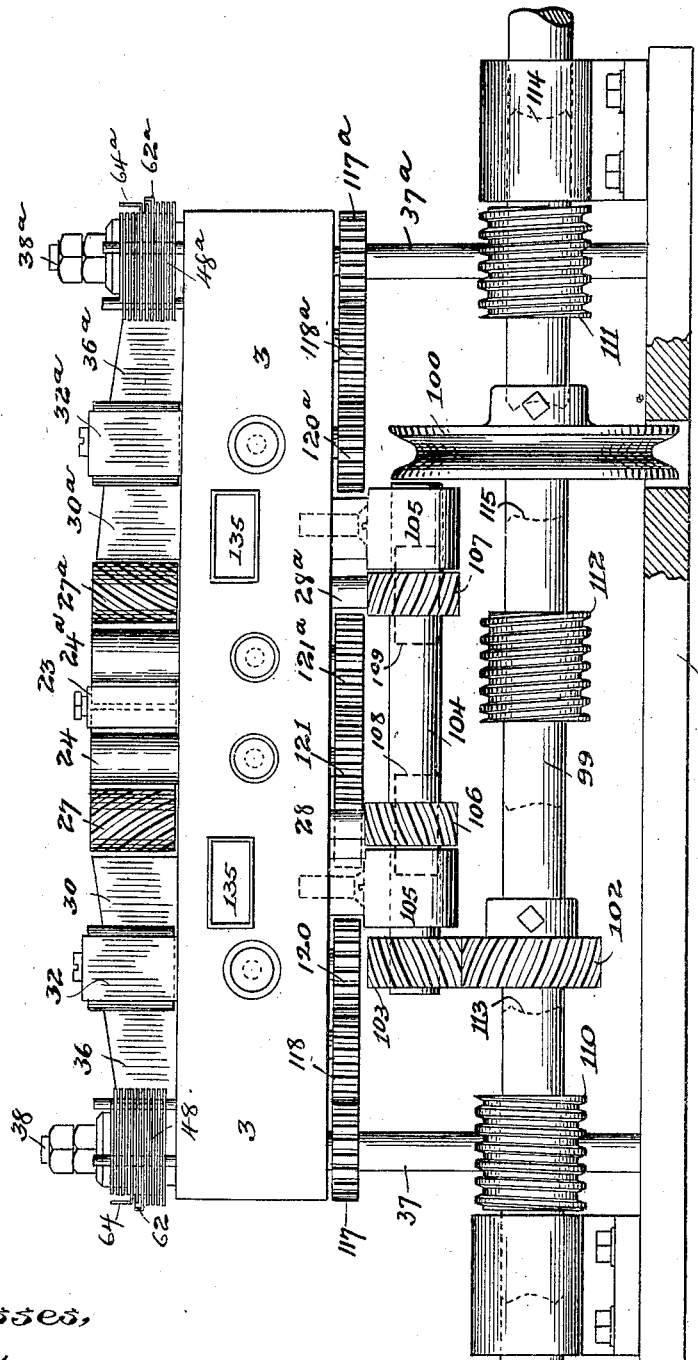
Figure 5:
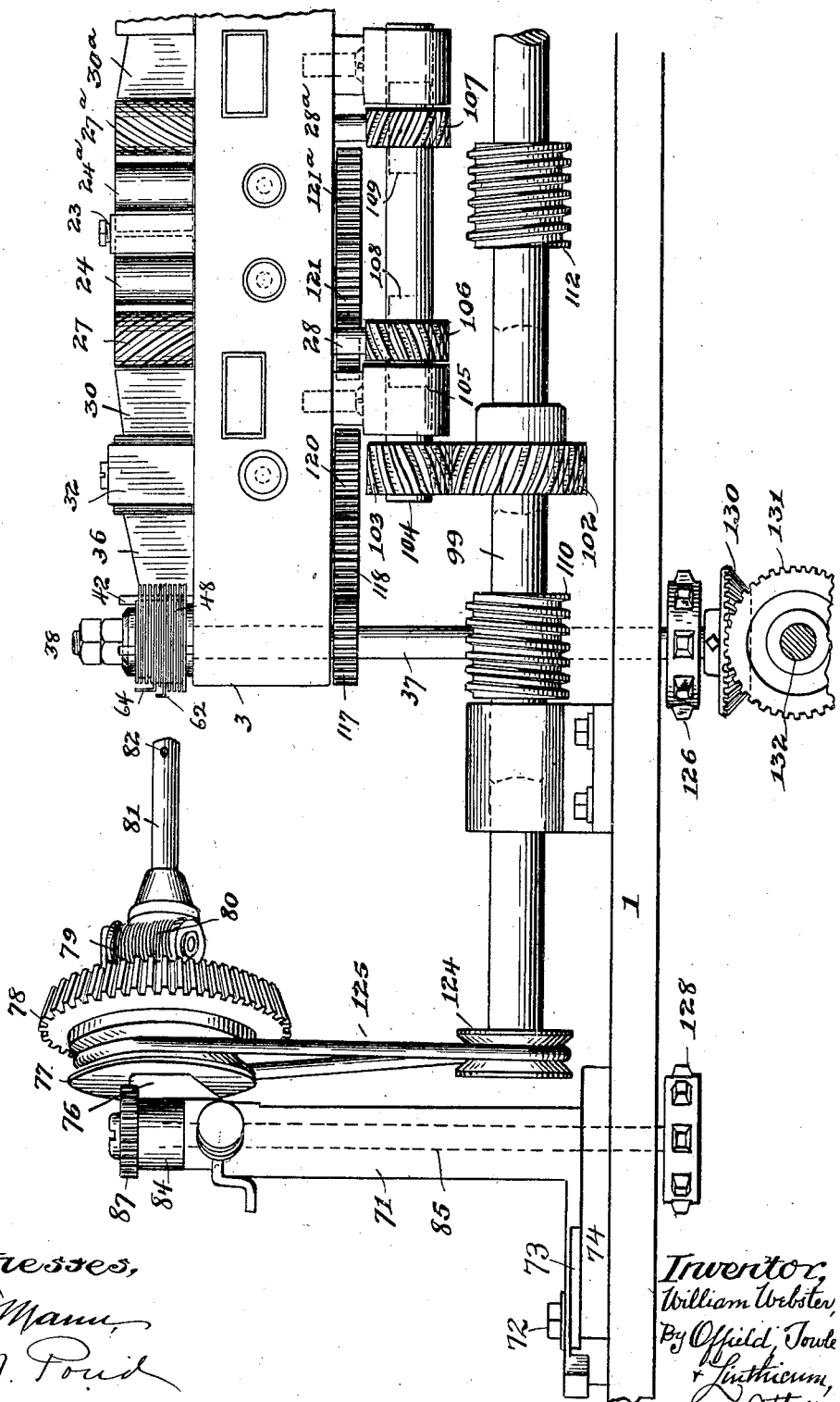
Figure 6:
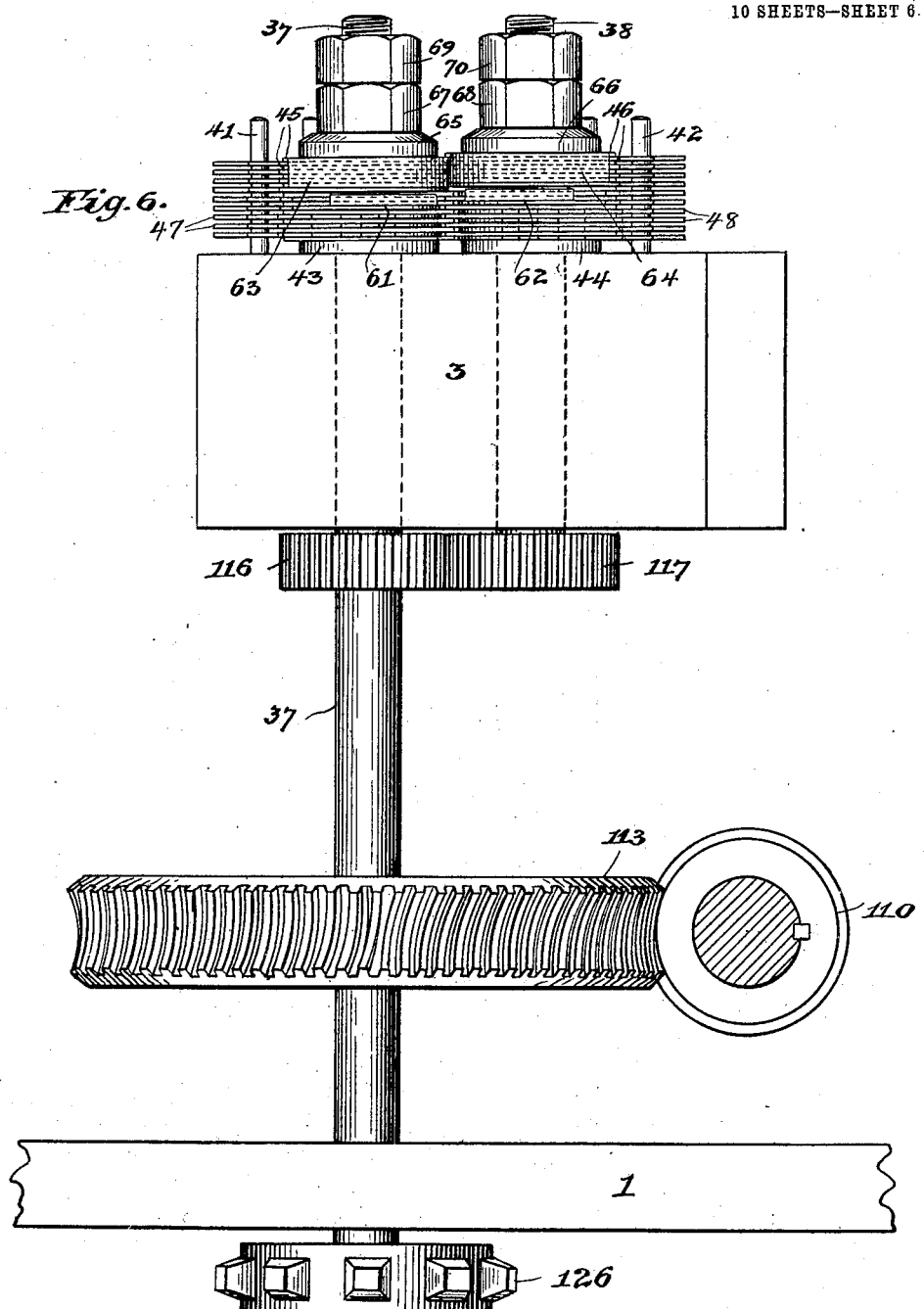
Figure 7:
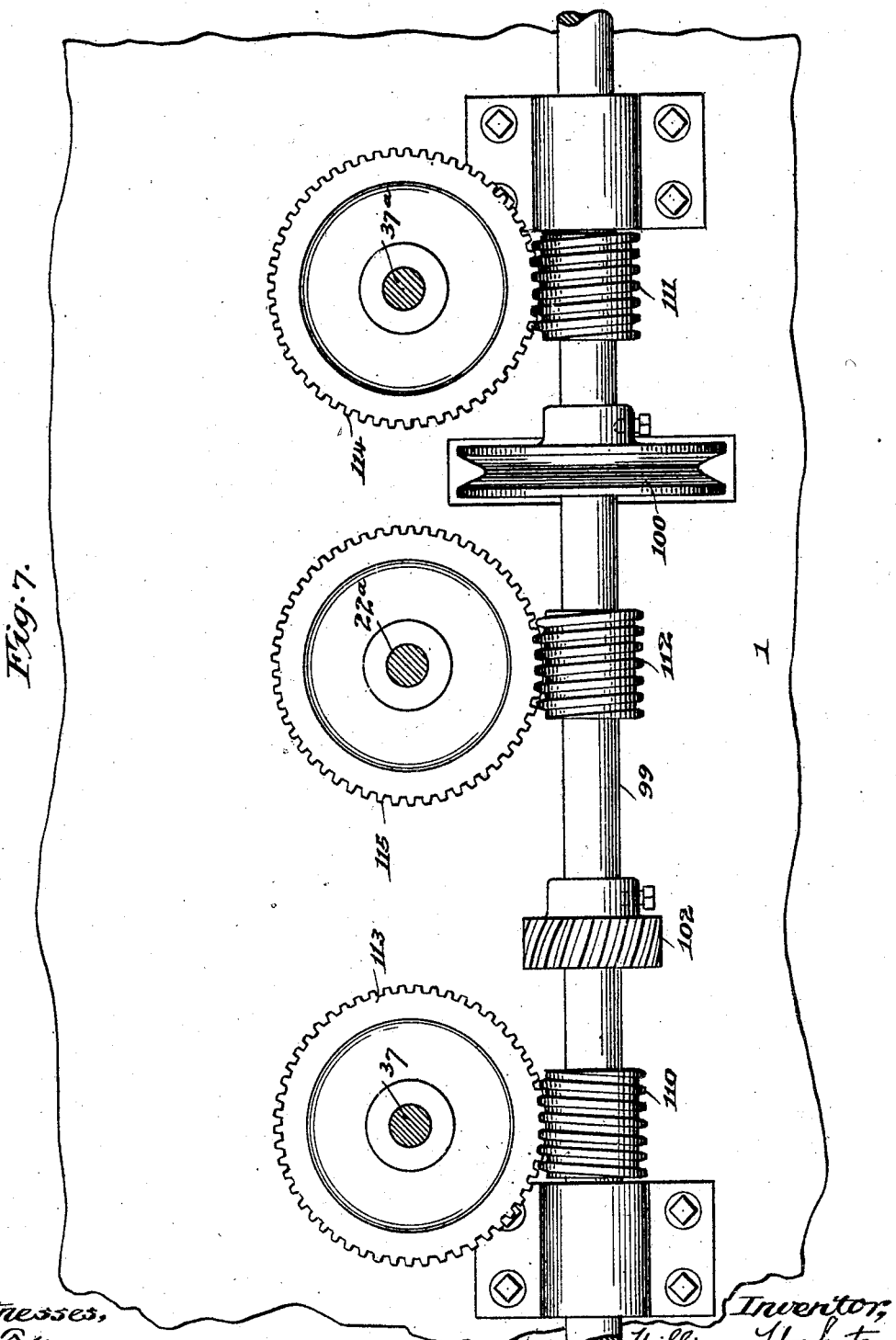

Figure 1 is a side elevational view of the complete machine with minor details omitted for the sake of clearness. Fig. 2 is a top plan view of one longitudinal half of the machine, it being understood that the other half is a duplicate of the same parts inversely arranged. Fig. 3 is an enlarged elevational view, partly in section, of the feeding-in mechanism substantially on the line 3 3 of Fig. 2. Fig. 4 is a side elevational view of the main intermediate portion of the machine with the winding devices omitted for the sake of clearness. Fig. 5 is a view similar to Fig. 4, but including one of the winders and its driving means. Fig. 6 is an enlarged detail of the quill-fibering mechanism and its driving means, which mechanism is duplicated at the two ends of the machine platform or table. Fig. 7 is an enlarged detail view of the main driving-shaft and showing the driving means therefrom to the quill-cutters at the two ends of the machine and the quill-fibering devices at the center of the machine. Fig. 8 is a detail plan view in the nature of a diagram, illustrating the system of geared connections between the main fiber-cutter and feeding-in shafts shown in Fig. 7 and the auxiliary feed-rolls. Fig. 9 is a diagrammatic plan view illustrating the sprocket and chain driving devices of each gang of winders. Fig. 10 is a top plan view of the mechanism in which the quill-sections are fibered, guided, and delivered to the receiving-tubes of the winders. Figs. 11, 12, and 13 are detail plan views of a plurality of stationary washers interposed between the circular cutters of one stack of fibering devices which serve the four-fold function of spacers for the cutting-disks, cleaners for the cutting-disks, fiber-ejectors, and fiber-guides between the cutters and the winders, said parts being shown in the relative angular positions which they occupy when assembled in the stack; and Figs. 14, 15, and 16 are views similar to Figs. 11, 12, and 13, respectively, of the corresponding washers in the opposite stack of cutters.

Before proceeding to a detailed description of the machine I will first briefly outline in a general way the preferred organization of the machine as herein shown and described, naming the several mechanisms and the order in which they coöperate.

The entire mechanism is superposed upon a flat oblong table or platform, the principal operating parts of the machine being carried by a smaller similarly-shaped bed-plate supported on suitable standards upon and above said table or platform. Centrally of one of the longer sides of the bed-plate is mounted a quill-feeding mechanism from which the stripped quills are advanced in successively-overlapping order with the nose of each quill several inches in advance of the nose of the next succeeding quill upon a quill-splitting knife, whence the two halves of the quills are fed in opposite directions past a pair of rotary cutters which clean the inner surfaces of the quill-sections of the pith. Thence the cleaned sections are advanced in substantially straight lines and in opposite directions toward the opposite ends of the bed-plate between stationary guides and advancing-rolls, whereby a continuous hold or grip upon the quill-sections is maintained into the action of fibering or slivering mechanisms located at the opposite ends of the bed-plate, each of which mechanisms splits the quill-sections longitudinally into a mass of fibers or slivers and through the agency of devices forming part of the fibering mechanism divides the mass of fibers or slivers into a plurality of divisions or bundles and guides and directs each division into and through the receiving-tubes of a series of winders situated at different angles behind and converging toward the discharge side of the fibering mechanism. In these winders the several bunches of fibered stock are wound about by a suitable cord or thread which binds them together into a continuous strip, the winders each being provided with gripping-rolls which serve to draw the strips through the winders at a suitable rate of speed to effect the proper binding together of the slivers. From the winders the wound strips at each end pass off the ends of the machine over a reciprocating coiling mechanism to and around a series of receiving-spools, on which they are laid in successive spiral layers.

Proceeding now to a detailed description of the machine and of the several coöperating mechanisms of which it is composed, 1 designates a rectangular horizontal table or platform supported at its four corners on legs 2. 3 designates a shorter horizontal bed-plate supported upon and above the table upon suitable standards 4. Substantially centrally of one of the longer sides of the bed-plate 3 is secured thereto a laterally-extending shelf 5, Figs. 2 and 3, constituting a support for the quill stacking and introducing mechanism. This latter comprises two or more pairs of posts 6 and 7, the members of each pair being spaced sufficiently to receive between them a series of superposed stripped quills 8. Inwardly of the guiding and supporting posts 6 and 7 there rises from the bed-plate a post 9, which has a deep longitudinal groove 10 on that side adjacent to the guides 6, the lower end of which groove is continued through the posts in the form of a feed-throat 11, Fig. 3, of sufficient size to admit the passage therethrough of the two lowermost quills of the series. The post 9 is preferably surmounted by a removable guide-hopper 12, Fig. 3, having outwardly-flaring walls adapted to readily receive and guide into the vertical groove of the post the advance or blunt ends of the quills. From the foregoing it will be seen that the stack of quills is supported and guided at its inner end by the grooved post 9 and intermediate its length by the inner and outer guide-posts 6 and 7. In order to effect the downward feed of the individual quills of the stack as fast as the quills are withdrawn from the bottom, I employ means for maintaining a constant downward pressure on the stack of quills, the means herein shown for this purpose consisting of a bar 13, disposed behind the stack and having at its ends pivoted fingers 14, which overlie the upper quill crosswise thereof, to which bar is secured a depending rod 15, Fig. 3, passing through and guided in the bed-plate extension-shelf 5 and platform 1 and terminating in the weight 16.

Referring next to the mechanism for advancing into the machine the successive quills of the stack from the bottom of the latter, 19 and 19ᵃ designate a pair of duplicate feed-disks that are mounted in the same horizontal plane on the upper ends of shafts 20 and 20ᵃ, journaled vertically in the bed-plate 3. A turkey-quill is of maximum diameter or thickness near its inner end and tapers therefrom gradually to its outer end, as shown in Fig. 3. The disks 19 and 19ᵃ have a thickness substantially equal to the maximum diameter of one quill plus the intermediate or mean diameter of the next quill for a purpose will which appear in connection with the description of the operation and are preferably provided with slightly grooved or fluted peripheries and with flattened portions (indicated at 19ᵇ in Fig. 2) which come opposite each other or into registration once during each revolution of the disks to permit the next to the lowermost quill to drop between the disks and be engaged thereby. These disks are so positioned in the horizontal plane of the feed slot or throat 11 that as the rear ends of the flattened portions 19ᵇ come together upon the next to the lowermost quill the latter is clamped between the peripheries of said disks and advanced thereby upon the continued rotation of the disks, the lowermost quill of the stack having been similarly gripped by the disks and partially advanced into the machine.

From the slot or throat 11 the nose of each quill advances some three or more inches behind the nose of the immediately-preceding quill into the grip of a pair of peripherally notched or milled feed-rolls 21 and 21ᵃ, mounted in the same horizontal plane on the upper surface of the bed-plate 3, said rolls being keyed on the upper ends of a pair of vertical shafts 22 22ᵃ, mounted in the bed-plate 3. From the grip of said rolls the quill passes directly upon the edge of a knife-blade 23, so disposed as to lie longitudinally of the advancing quill and centrally of its path of movement, whereby the quill is split longitudinally into two halves, one of them representing (in the feeding arrangement shown) the hard back of the quill and the other representing the softer face portion of the quill. This latter, making a turn of substantially a right angle to one side, is engaged by and fed between the feed-roll 21 and a companion feed-roll 24, keyed on the upper end of a shaft 25, mounted in an adjustable bearing-block 26, whence it passes between the periphery of a rotary cutter-disk 27, mounted on a vertical shaft 28, journaled in the bed-plate, and a guide-block 29 opposite the periphery of said cutter engaging the outer surface of the quill-section. Between the cutter 28 and guide-block 29 the inner side of the quill is denuded of its contained pith and thoroughly cleaned. The cutter-disk rotates in the direction of movement of the quill-section and is provided with oblique peripheral teeth which effectually eat out the body of pith contained in the half-quill.

From the pith-cutter 28 the cleaned half-shell passes through a tubular tapered guide-channel 30 to the nip of another pair of peripherally-milled feed-rolls 31 and 32, keyed on vertical shafts 33 and 34, respectively, the roll 32 being carried in an adjustable bearing-block 35, so as to be adjustable toward and away from the periphery of its companion roll 31. By these rolls 31 and 32 the cleaned section or sections of quill-stock are further advanced through another tubular tapered guide-channel 36 into the action of the fibering mechanism, which splits the quills longitudinally into a mass of slivers or fibers, which latter as they emerge from this mechanism are divided into a plurality of parts or portions, each of which is led away separately to and through a mechanism which wraps a cord or thread therearound to bind each division into a continuous cord. This mechanism, which is shown more particularly in Figs. 6 and 10 to 16, inclusive, consists, generally speaking, of two stacks of superposed rotary cutting-disks separated by alternate stationary washers, which serve the quadruple function of spacing the cutting-disks, so that the edges of one series slightly overlap the proximate edges of the other series, of cleaning the cutting-disks and preventing the accumulation of fine particles of the material therebetween, of ejecting the individual slivers from between the cutter-disks, and of guiding said slivers into the tubular receiving-mouths of their appropriate winders. The construction of this mechanism will be readily understood by reference to the detail views, Fig. 6 and Figs. 10 to 16, inclusive, wherein 37 and 38 designate a pair of vertical shafts rotatably mounted in the bed-plate 3 beyond and to either side of the discharge end of the channel-guide 36, said shafts having keys 39 and 40, respectively, Fig. 10. To either side of said shafts are mounted in the bed-plate pairs of posts 41 and 42, respectively. On the shafts 37 and 38 are mounted first a pair of relatively thick shims 43 and 44, superposed on which are series of alternately-disposed circular cutting-disks and interposed washers of the same thickness as the disks. All of the cutter-disks are keyed on the respective shafts 37 and 38, so as to rotate therewith, while the apertures of the washers are of sufficient diameter to permit the shafts and their keys to rotate therein, as shown in Fig. 10. The two series of alternate cutters and washers are so positioned on the shafts 37 and 38, respectively, that the cutters of one series occupy the horizontal plane of the washers of the other series, and vice versa, so that the proximate edges of the cutter-disks overlap each other, the inner peripheral portion of each cutter-disk lying between the inner peripheral portions of the adjacent cutter-disks of the opposite series. The cutter-disks of the series on shaft 37 are designated by 45, and the coöperating cutter-disks mounted on shaft 38 are designated by 46. The washers, of which those mounted on the shaft 37 are designated by 47 and those mounted on the shaft 38 are designated by 48, consist of thin flat plates of the same thickness as the cutter-disks and provided with apertures 49 and 50, loosely engaging the posts 37 and 38, respectively, and with smaller separated apertures 51 and 52, that engage the posts 41 and 42, respectively, and hold said washers non-rotatable about the axes of the cutters. The edges 53 and 54 of the washers lying adjacent to each other are disposed inwardly of the overlapping portions of the cutter-disks, and these edges are continued on the discharge side of the cutters in the form of straight tangential portions disposed at different angles to constitute guides for the fibers into the receiving-tubes of the winders. In the present drawings I have shown the fibering mechanism as serving six winders, the receiving-tubes of which are grouped about thirty-six degrees apart around the discharge side of the fibering mechanism. In this case the tangential guiding edges of one group of washers on each side are extended at a comparatively small angle from the line of feed of the quills into the fibering mechanism, as shown at 55 and 56, Figs. 13 and 16. The tangential guiding edges of another group are extended at a somewhat greater angle, as shown at 57 and 58, Figs. 12 and 15, while the tangential guiding edges of the third group extend at approximately a right angle from the line of feed of the quills, as shown at 59 and 60, Figs. 11 and 14. In the particular instance shown the lowermost group, consisting of four washers, guides the lowermost portion of the fibered stock over the tangential margins 55 and 56 into the two central receiving-tubes of the winders, the intermediate group, comprising two washers on each side, guides the intermediate portion of the fibered stock over the tangential edges 57 and 58 into the intermediate receiving-tubes of the winders, and the upper group, consisting of four washers on each side, guides the upper portion of the fibered stock over the tangential guides 59 and 60 into the outermost receiving-tubes of the winders. I have found in practice that the successive fibers as they pass in more or less overlapped condition through the cutters cling so closely to the guiding edges of the stationary washers that the latter may be relied upon to a large extent to eject the fibered stock and conduct the several divisions thereof into the receiving-tubes of the winders. Some short and fragmentary slivers are, however, produced in the fibering mechanism, and to insure the guiding of these into the appropriate winders I prefer to employ, particularly in connection with the intermediate and most widely divergent guiding portions of the washers, auxiliary guides in the form of vertical flanges 61 and 62 on the uppermost member of the bottom series of washers on each side, respectively, and similar flanges 63 and 64 on the uppermost member of the intermediate series of washers on each side, respectively. The flanges 61 and 62 lie parallel and opposite the tangential guiding edges 57 and 58 of the intermediate series, and the flanges 63 and 64 lie parallel with and opposite the tangential guiding edges 59 and 60 of the uppermost series. These guiding-flanges serve to insure a proper direction of travel to short slivers or to the advance ends of any slivers which may tend to spring out and fail to follow closely the guiding edges of the washers themselves. The two coöperating series or stacks of cutters and washers are suitably clamped and confined by means of upper washers 65 and 66, nuts 67 and 68, and lock-nuts 69 and 70.

From the fibering mechanism last described the divided sections of the fibered stock pass off to and through a series of winders, which coil about them a binding cord or thread. These winders, six of which are herein shown at each end of the machine, are duplicates of each other and are positioned on the table 1 at suitable angles to receive the several sections. Each winder is mounted on a post 71, Figs. 2 and 5, secured at its base by a clamping-bolt 72, operating in a guide 73 of a horizontal feed-plate 74 in such a manner as to be adjustable toward and from the fibering mechanism. The post 71 has rotatably mounted on a tubular shaft 75, projecting inwardly from a bracket 76, connected to its upper end, a pulley 77, fast on the outer face of a bevel-gear 78, on the inner face of which latter are mounted spools 79, carrying the winding-thread 80. Attached to the inner face of each gear concentrically therewith and in alinement with the tubular shaft 76, is an inwardly-projecting tube 81, which tubes extend into close proximity to the outer extremities of the tangential guides of the several series of washers of the fibering mechanism, as clearly shown in Fig. 2. The threads 80 from the spools are threaded through small holes 82 in the tubes 81, near the inner ends of the latter. On the upper end of each post 71 is mounted side by side a pair of gripping-rolls 83 and 84, the function of which is to grip the wound stock, draw it through the winders, and pass it on to the receiving-rolls. One of these rolls (83, as herein shown) is fast on the upper end of a shaft 85, rotatably mounted in the head of the post 71, said shaft extending downwardly through a bearing in the table 1, Fig. 5. The roll 83 carries on its upper end a small gear 86, which meshes with a similar gear 87 on the companion roll 84 and drives the latter.

From the winders the wound strips may be carried to and received upon any suitable receiving reels or spools, the mechanism herein shown for this purpose being as follows: In a pair of bracket-arms 88, secured to and extending outwardly from the end of the table 1, is journaled a reel-shaft 89, Fig. 2, carrying on one overhanging end a sprocket-wheel 90, by which it is driven. Keyed on this shaft are a series of friction-disks 91 and 92, and loosely mounted on the same between said disks are a series of receiving-spools 93. One head of each spool is crowded against the respective disks 91 by means of a coiled spring 94, which at one end thrusts against the other head of the spool, its opposite end having an abutment against the disk 92 to secure the required frictional effect between the opposite head of the spool and its coöperating friction driving-disk 91. The strips or cords are laid in close and uniform wind by a well-known type of coiling mechanism consisting of a sleeve 95, slidable longitudinally on a rod 96, supported parallel with and beyond the receiving-spools, this sleeve carrying a series of grooved pulleys 97, one for each spool, over which the wound strips pass, and having at one end the usual tongue 98, that rides back and forth in a right and left hand thread formed on one end of the shaft 96.

Thus far I have described the various mechanisms and instrumentalities that perform the successive operations upon the material treated, transferring it from stripped quills at the start to continuous uniform strips or cords of the fibers of the quills, it being understood that the mechanism shown in Fig. 2 as constituting one longitudinal half of the machine is duplicated throughout the other longitudinal half of the machine, as indicated in the general side elevational view of Fig. 1, wherein to the extent that duplicate parts are shown they are indicated by the same reference-numerals with an alphabetical exponent. I will now briefly describe the mechanism by which the several operating parts already described are given their respective movements and caused to perform their respective functions in the operation of the machine.

Referring first to the elevational views, Figs. 1, 3, 4, and 5, and the fragmentary plan view, Fig. 7, 99 designates the main driving-shaft of the machine, which is horizontally journaled upon the table 1 and bed-plate 3 and has fast thereon a grooved pulley 100, receiving motion from a belt 101, driven from any suitable source of power. This shaft also carries a spiral gear 102, that meshes with and drives a similar spiral gear 103, fast on one end of an overhanging counter-shaft 104, suitably journaled in brackets 105, depending from the bed-plate 3. On the counter-shaft 104 are a pair of spiral gears 106 and 107, that engage and drive horizontal spiral gears 108 and 109, respectively, Figs. 3 and 4, upon the lower ends of the cutter-shafts 28 and 28$^a$, whereby the pith-cutters are positively driven at high speed. On the main shaft 99 are three worms 110, 111, and 112, Figs. 4 and 7, that engage and drive corresponding worm-wheels 113, 114, and 115 on the lower ends of the fiber-cutter shafts 37 and 37$^a$ and the feed-roll shaft 22$^a$, respectively. Referring to Figs. 6 and 8, it will be seen that the shafts 37 and 37$^a$ carry small gears 116 and 116$^a$, which mesh with and drive similar gears 117 and 117$^a$, respectively, on the companion fiber-cutter shafts 38 and 38$^a$, whereby both fibering mechanisms at the opposite ends of the machine are positively driven. Idle gears 118 and 118$^a$, Fig. 8, meshing with and driven by the gears 116 and 116$^a$, respectively, engage and drive gears 119 and 119$^a$ on the feed-roll shafts 33 and 33$^a$, said last-named gears engaging and driving similar gears 120 and 120$^a$ on the companion feed-roll shafts 34 and 34$^a$. The central worm-driven shaft 22$^a$ carries a gear 121$^a$, that meshes with and drives a companion gear 121 on the feed-roll 22, and this latter gear, through an idle gear 122, drives a gear 123 on the shaft of the quill-gripping roll 19, said gear 123 engaging and driving a companion gear 123$^a$ on the shaft of the companion gripping-roll 19$^a$.

The several winders of each group are driven by the intermeshing bevel-gears 78, as shown in Fig. 2, receiving their motion from one of their number, which is driven from the main shaft 99 by means of a pulley 124 thereon, Fig. 5, and a belt 125, connecting the pulleys 124 and 77. For actuating the several pairs of gripping-rolls 83 and 84 I employ a sprocket-wheel 126 on the fiber-cutter shaft 37 beneath the table 1, which engages and drives, through a chain 127, a series of similar sprocket-wheels 128, Fig. 9, on the lower ends of the several gripping-roll shafts 85, a series of adjustable idlers 129, serving to both guide and tension the chain. For imparting a positive drive to the reel-shaft I employ on the lower end of the fiber-cutter shaft 37 a bevel-gear 130, which drives a companion gear 131 on the inner end of a power-transmitting shaft 132, on the outer end of which latter is a sprocket-wheel 133, Fig. 2, that drives, through a sprocket-chain 134, the reel-shaft sprocket 90.

In order to keep the machine as clean and free of dust as possible, I provide means for drawing off by air-suction the pith of the shells as fast as it is removed by the cutters, the means herein shown comprising cored passages 135, Fig. 3, formed in the bed-plate 3, and leading from the under side of the pith-cutters to the outer face of the bed-plate and connecting with suitable suction-pipes, (indicated at 136.)

The operation of the machine has already been set forth in connection with the description of its various parts and mechanisms, and it only remains to point out the leading novel mechanical functions and results secured thereby. In the first place, it will be observed that from the point at which the quills are split the two sections of each quill pass off through separate cleaners and guides to separate sets of fibering and winding mechanisms. These latter are herein shown and described as disposed at opposite ends of the machine-frame; but this particular arrangement is for the sake of simplicity and economy in the disposition of the driving devices, it being obvious that the particular disposition of the separate sets of fibering and winding devices on the machine is immaterial so long as such separate devices are employed to handle different parts or sections of the quill. As suggested in the preliminary part of this specification, by splitting the quills between the backs and faces thereof and leading the backs to one set of fibering and winding mechanisms and the faces to the other, two products embodying the different characteristics of the backs and faces of the quills, in respect to hardness and toughness, are obtainable, which is an important feature and advantage of the present machine. The quills are advanced into the machine over the splitting-knife and past the pith-cutters in substantially duplex order, one above the other, the lowermost quill of the pair being a few inches in advance of the uppermost, and the two cleaned sections are brought into side-by-side arrangement during their passage through the tapered guides 30 and 36, the upper walls of which are downwardly inclined in the direction of travel of the quill-sections. This manner of feeding in the quills and handling them during their passage to the fibering mechanisms insures a sufficient stock of quill substance to supply both gangs of winders at the opposite ends of the machine, respectively. The novel form and construction of washers employed in the fibering mechanism is of importance, since these washers are capable of serving not only the functions of spacers and cleaners for the cutting-disks, but also the additional functions of guides and dividers for the fibered stock and of supplying the individual winders of each series.

The driving of the several winders of each series by direct intermeshing gears of equal size, one of which is directly driven from the main shaft and drives all the others insures equality and uniformity in the work of the winders. Also the actuation of the reel-shaft by the positive driving means shown and described prevents possibility of slipping and insures a constant take-up and spooling of the product as fast as it is delivered by the machine.

It is evident that the details of the several parts and mechanisms of the machine and their relative order or arrangement may be somewhat varied by those skilled in the art without departing from the principle of the invention or sacrificing any of the benefits and advantages flowing therefrom. Hence the invention is not limited to the particular structure and organization of machine shown and described except to the extent clearly indicated in specific claims.

I claim—

1. In an organized mechanism for producing corded fibers from quills, the combination with a mechanism for splitting the quills, of duplicate means for treating the quill-sections located on opposite sides of said splitting mechanism, respectively, each of said means comprising a cleaner for removing the pith from the split sections, a fibering mechanism for reducing the split sections to a mass of fibers, and a mechanism for winding a binding cord or thread around said fibers, substantially as described.

2. In an organized mechanism for producing corded fibers from quills, the combination with a mechanism for splitting the quills, of duplicate means for treating the quill-sections located on opposite sides of said splitting mechanism, respectively, each of said means comprising a depithing device, a fibering mechanism for reducing the split sections to a mass of fibers, a plurality of winders, and means in association with said fibering mechanism for dividing the mass of fibers and guiding the divisions thereof into said winders, substantantially as described.

3. In a quill-treating machine, the combination with two coöperating series of cutter-disks having fiber-guiding devices interposed between superposed disks, of a plurality of winders suitably disposed to receive the fibered stock directly from said fiber-guiding devices, substantially as described.

4. In a quill-treating machine, the combination with means for splitting a quill and means for depithing the split sections, of two coöperating series of cutter-disks having fiber-guiding devices interposed between superposed disks, and a plurality of winders having their fiber-receiving members disposed in close proximity to said fiber-guiding devices and directly receiving the fibered stock therefrom, substantially as described.

5. In a quill-treating machine, the combination with a plurality of angularly-disposed winders, of two stacks of rotary cutters between which the quill-stock is fibered, and washers disposed alternately between the cutters of each stack, said washers having fiber-guiding edges arranged at various angles corresponding to the relative angular positions of the winders and serving to divide the stock on the discharge side of the cutters and conduct the divisions into said winders, substantially as described.

6. In a quill-treating machine, the combination with a plurality of angularly-disposed winders, two stacks of rotary cutters between which the quill-stock is fibered, of washers disposed alternately between the cutters of each stack, said washers having fiber-guiding edges arranged at various angles and serving to divide the stock on the discharge side of the cutters, and certain of said washers also having auxiliary guides adapted to coöperate in effecting the division of the fibered stock, substantially as described.

7. In a quill-treating machine, the combination with a plurality of angularly-disposed winders, of two stacks of rotary cutters between which the quill-stock is fibered, and washers disposed alternately between the cutters of each stack, said washers having fiber-guiding edges arranged at various angles corresponding to the relative angular positions of the winders and serving to divide the stock on the discharge side of the cutters and to conduct the divisions into said winders, certain of said washers also having upright guide-flanges adapted to coöperate in dividing the fibered stock and guiding the same to the winders, substantially as described.

8. In a quill-treating machine, the combination with a quill-fibering mechanism, of a plurality of winders disposed side by side opposite the discharge side of said fibering mechanism and receiving the fibered stock therefrom, intermeshing gears on the spindles of said winders, and driving means connected to one of said winders, substantially as described.

9. In a quill-treating machine, the combination with a quill-fibering mechanism, of a plurality of winders disposed side by side at angles to each other opposite the discharge side of said fibering mechanism and receiving the fibered stock therefrom, intermeshing bevel-gears on the spindles of said winders, and driving means connected to one of said winders, substantially as described.

10. In a quill-treating machine, the combination with a quill-fibering mechanism, of a plurality of winders grouped about the discharge side of said fibering mechanism, a pair of intergeared gripping-rolls mounted on each of said winders, a series of shafts on which one roll of each pair is mounted, sprockets on said shafts, a driving-sprocket, and a single sprocket-chain connecting said driving-sprocket and roll-shaft sprockets, substantially as described.

11. In a quill-treating machine, the combination with a quill-fibering mechanism and a driving-shaft therefor, of a plurality of winders grouped about the discharge side of said fibering mechanism, a pair of intergeared gripping-rolls mounted on each of said winders, a series of shafts on which one roll of each pair is mounted, sprockets on said shafts, a driving-sprocket on the driving-shaft of said fibering mechanism, and a single sprocket-chain connecting said driving-sprocket and roll-shaft sprockets, substantially as described.

12. In a quill-treating machine, the combination with two coöperating series of cutter-disks and rotatable shafts on which the same are mounted, of one or more winders receiving the fibered stock from said cutter-disks, a reel-shaft having one or more reels thereon, and positive driving connections between one of said cutter-shafts and said reel-shaft, substantially as described.

13. In a quill-treating machine, the combination with two coöperating series of cutter-disks and rotatable shafts on which the same are mounted, of one or more winders receiving the fibered stock from said cutter-disks, a reel-shaft having one or more reels thereon, an intermediate power-transmitting shaft, intermeshing gears between the latter and one of said cutter-shafts, and chain-and-sprocket connections between said intermediate and reel shafts, substantially as described.

WILLIAM WEBSTER.

Witnesses:
 BASIL N. ESSERY,
 R. G. FISHER.